United States Patent
Bjerge et al.

(10) Patent No.: US 8,242,617 B2
(45) Date of Patent: Aug. 14, 2012

(54) METHOD AND ARRANGEMENT FOR DAMPING OF TOWER-OSCILLATIONS

(75) Inventors: Martin Bjerge, Herning (DK); Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 485 days.

(21) Appl. No.: 12/502,550

(22) Filed: Jul. 14, 2009

(65) Prior Publication Data

US 2010/0013235 A1 Jan. 21, 2010

(30) Foreign Application Priority Data

Jul. 16, 2008 (EP) ..................................... 08012871

(51) Int. Cl.
*F03D 9/00* (2006.01)
*H02P 9/04* (2006.01)
(52) U.S. Cl. ........................................................ 290/44
(58) Field of Classification Search .................... 290/44, 290/55; 700/280, 287; 415/1, 2.1, 4.1, 4.5; 416/1; 52/170
See application file for complete search history.

(56) References Cited

U.S. PATENT DOCUMENTS

| | | | | |
|---|---|---|---|---|
| 4,410,806 A * | 10/1983 | Brulle | ............................. | 290/44 |
| 4,420,692 A * | 12/1983 | Kos et al. | ........................ | 290/44 |
| 4,435,647 A * | 3/1984 | Harner et al. | ................... | 290/44 |
| 6,420,795 B1 | 7/2002 | Mikhail et al. | | |
| 7,309,930 B2 | 12/2007 | Suryanarayanan et al. | | |
| 7,400,055 B2 * | 7/2008 | Nagao | ............................. | 290/44 |
| 7,569,944 B2 * | 8/2009 | Oohara et al. | .................. | 290/44 |
| 7,692,322 B2 * | 4/2010 | Wakasa et al. | .................. | 290/44 |
| 8,044,529 B2 * | 10/2011 | Egedal | ............................. | 290/44 |
| 2005/0012339 A1* | 1/2005 | Mikhail et al. | .................. | 290/44 |
| 2006/0066111 A1* | 3/2006 | Suryanarayanan et al. | .... | 290/44 |
| 2007/0182162 A1* | 8/2007 | McClintic | ........................ | 290/55 |
| 2008/0260514 A1* | 10/2008 | Nielsen et al. | ................. | 415/4.3 |
| 2010/0063769 A1* | 3/2010 | Egedal | ........................... | 702/154 |

FOREIGN PATENT DOCUMENTS

EP 1816347 A1 8/2007
WO 9007823 A1 7/1990

* cited by examiner

*Primary Examiner* — Julio Gonzalez

(57) ABSTRACT

A method and an arrangement for the damping of tower-oscillations are provided. The method for the damping of tower-oscillations includes transforming a rotation into electrical power using a generator, which is located on top of the tower. The electrical power is transformed from AC to DC and back to AC by a converter. A power-reference-signal is used by the converter to control the delivered electrical power. A variable power-offset-signal is added to the power-reference-signal before it is used for the control. The variable power-offset-signal is based on a mean value of the power-reference-signal and a side-to-side-oscillation of the tower.

18 Claims, 2 Drawing Sheets

METHOD AND ARRANGEMENT FOR DAMPING OF TOWER-OSCILLATIONS

CROSS REFERENCE TO RELATED APPLICATIONS

This application claims priority of European Patent Office application No. 08012871.3 EP filed Jul. 16, 2008, which is incorporated by reference herein in its entirety.

FIELD OF INVENTION

The invention relates to a method and an arrangement for damping of tower-oscillations.

Especially the invention relates to a tower of a wind-turbine, which wears a nacelle on top.

BACKGROUND OF INVENTION

If a wind-turbine tower is oscillating there will be the effect of tower-movements. This results to a big load, which acts on a mounted yaw-system of the wind-tower, on a gear within the wind-turbine nacelle and on the tower itself.

It is known to reduce this effect by a so called "active damping" of the tower oscillation.

The U.S. Pat. No. 7,309,930 B2 describes a solution to damp vibration based on a controlled torque. A vibration damping system for the wind-turbine is mounted on the tower. The vibration damping system comprises a vibration damper, which uses a variable signal to control the torque. The variable signal is based on a speed of a generator.

Another way to deal with tower oscillations is to design relevant mechanical constructions strong enough to tolerate extra forces, which are induced by the tower-movements.

Additionally relevant spear parts have to be changed more often because of wear and tear.

SUMMARY OF INVENTION

It is the aim of the invention, to provide an improved method and arrangement for the damping of tower-oscillations of a wind-turbine.

This problem is solved by the features of the claims. Preferred embodiments of the invention are subject of the subsequent claims.

According to the inventive method for damping of tower-oscillations a rotation is transformed into electrical power by a generator, which is located on top of the tower. The electrical power is transformed from AC to DC and back to AC by a converter. A power-reference-signal is used by the converter to control the delivered electrical power. A variable power-offset-signal is added to the power-reference-signal, before it is used for control. The variable power-offset-signal is based at a mean value of the power-reference-signal and is based at a side-by-side-oscillation of the tower.

According to the invention a power-set-point is changed in that way, that a torque of the tower is oscillated with another power. This power shows the same frequency as the tower oscillations but shows an adapted phase-shift. The phase-shift is adapted in that way, that the tower oscillations are reduced, so typically a phase-shift of 180° is used.

The tower oscillations or vibrations are measured by a G-sensor in a preferred embodiment, while this sensor could be placed on top of the tower or within a nacelle of a wind-turbine, etc.

The signal of the sensor is filtered and delayed to get the optimized phase-shift. Then the phase-shifted-signal is multiplied with a mean power-reference-signal, to ensure that the power of the signal to be used to damp the tower will scale with the mean power-reference-signal.

The damping signal is then added to the power-reference-signal before it is used for control of the converter.

The signal generated by multiplication is saturated with a soft-saturator-function in a preferred embodiment. This is done to ensure that the amplitude of the signal is not to large as this would result in damaging the wind-turbine or would result in large loads in the wind-turbine. Because of the soft-saturation harmonics of the tower frequency are avoided.

In the prior art mentioned above the generator speed signal is a vital part of the control system to dampen the vibrations of the tower. By using the torque as reference as it is within the U.S. Pat. No. 7,309,930 B2 for the damping power reference, the relation between damping power reference and mean power reference will increase, when the mean power is decreasing and the rotor speed is constant. This results in high flicker level at the grid. In contrast to this the inventive method leads to a less flicker level at the grid successfully.

An advanced improvement by adjusting the power-reference-signal by multiplication as it is within this invention is, that the adjusted power-reference-signal shows a constant relation to a mean power signal.

BRIEF DESCRIPTION OF THE DRAWINGS

The invention is described in more detail with help of a drawing.

DETAILED DESCRIPTION OF INVENTION

Figure 1:
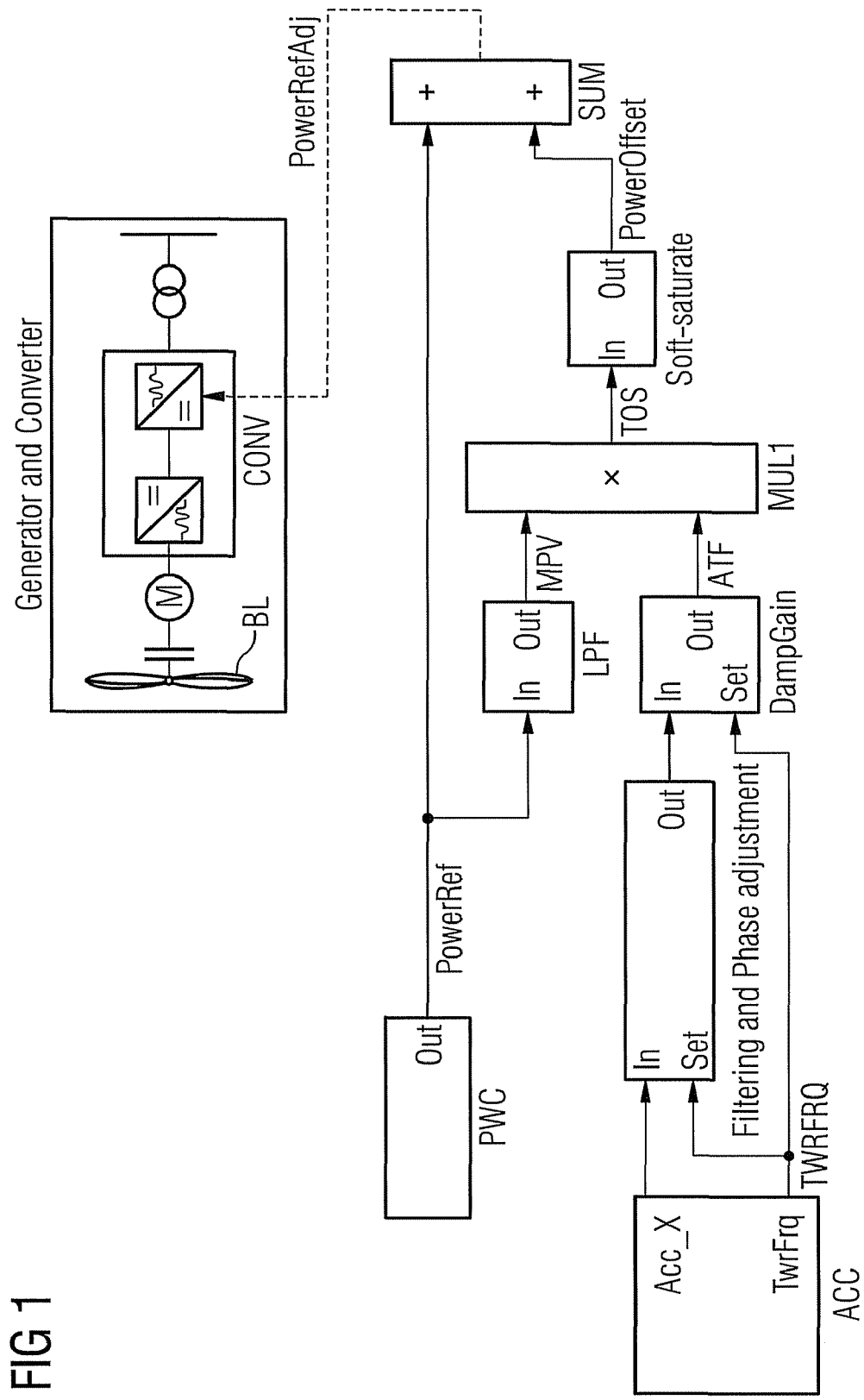
FIG. 1 shows a block-diagram of the inventive method for the damping of tower-oscillations.

Referring to FIG. 1 a nacelle of a wind-turbine wears a number of blades BL to rotate within the wind. The resulting rotation acts on a generator or motor M, where the rotation is transformed into electrical power.

The frequency varying AC power is transformed into a static frequency to match a connected grid. This transformation is done by a converter CONV, which is a combination of a generator inverter and a grid inverter.

The generator inverter converts AC to DC. The grid inverter converts the DC back to AC with a frequency, which is matching to the connected grid.

A power controller PWC is used to adjust an obtained electrical power from the rotation up to a rated power-value. This control is done by the use of a power-reference-signal powerRef, which is brought to the converter CONV.

If the rated power-value is reached, the power-reference-signal powerRef is kept constant.

The power-reference-signal powerRef of the power-controller PWC is brought to the converter CONV via a summation-unit SUM. By help of the summation-unit SUM the power-reference-signal powerRef is modified before it reaches the converter CONV. So the power-reference-signal powerRef is brought as a first input-signal to the summation-unit SUM.

The power-reference-signal powerRef is also used to generate a second input-signal for the summation-unit SUM for the modification.

The power-reference-signal powerRef is brought to a low-pass-filter LPF, too. The low-pass-filter LPF calculates a mean-power-value MPV in dependency of a chosen time interval. Typically a few seconds are used as time interval.

The calculated mean-power-value MPV is brought as input signal to a first multiplication-unit MUL1.

There is an accelerometer ACC, which is used to measure a vibration signal of the tower. For example a so called "G-sensor" could be used for this purpose, to be placed on the top of the tower or within the nacelle of the wind-turbine.

But this vibration-signal is interfered by other signals like noise, so a unit "filtering and phase adjustment" has to be used to remove the interfering signals from the measured vibration-signal.

According to this an acceleration-signal Acc_X and a tower-frequency-signal TWRFRQ are measured and are used to adjust a filter and a delay setting of the unit "filtering and phase adjustment".

So the unit "filtering and phase adjustment" generates an output-signal to be used as input-signal for a unit "Damp-Gain".

The unit "DampGain" is used for an amplitude-adjustment of its input-signal to generate a signal, which represents the acceleration-signal Acc_X with an usable amplitude for calculations needed later.

This leads to an actual tower-frequency ATF, which is brought as input-signal to the first multiplication-unit MUL1, too.

The first multiplication-unit MUL1 calculates a tower-oscillating-signal TOS as output-signal. This tower-oscillating-signal TOS is saturated by a unit "soft-saturate", which shows a so called "soft-saturator-function" as described now. Because of the saturation an output-signal PowerOffset is built by the unit "soft-saturate".

The soft-saturator-function has a gain, which is adjusted dynamically between 0 and 1. If peak-values of the tower-oscillation-signal TOS reach a predetermined saturation-limit, the gain is reduced. So the output-signal PowerOffset is kept under the saturation-limit.

The gain is raised dynamically step by step again, if the peak-values of the tower-oscillation-signal TOS are reduced.

The soft-saturator-function is described later exemplary by help of FIG. 2.

The power-reference-signal powerRef and the output-signal PowerOffset are summed up by the summation-unit SUM to generate the modified power-reference-signal PowerRef-Adj, which is brought to the converter CONV.

This adjusted power-reference-signal powerRefadj is now used to control the converter CONV as described above.

Figure 2:
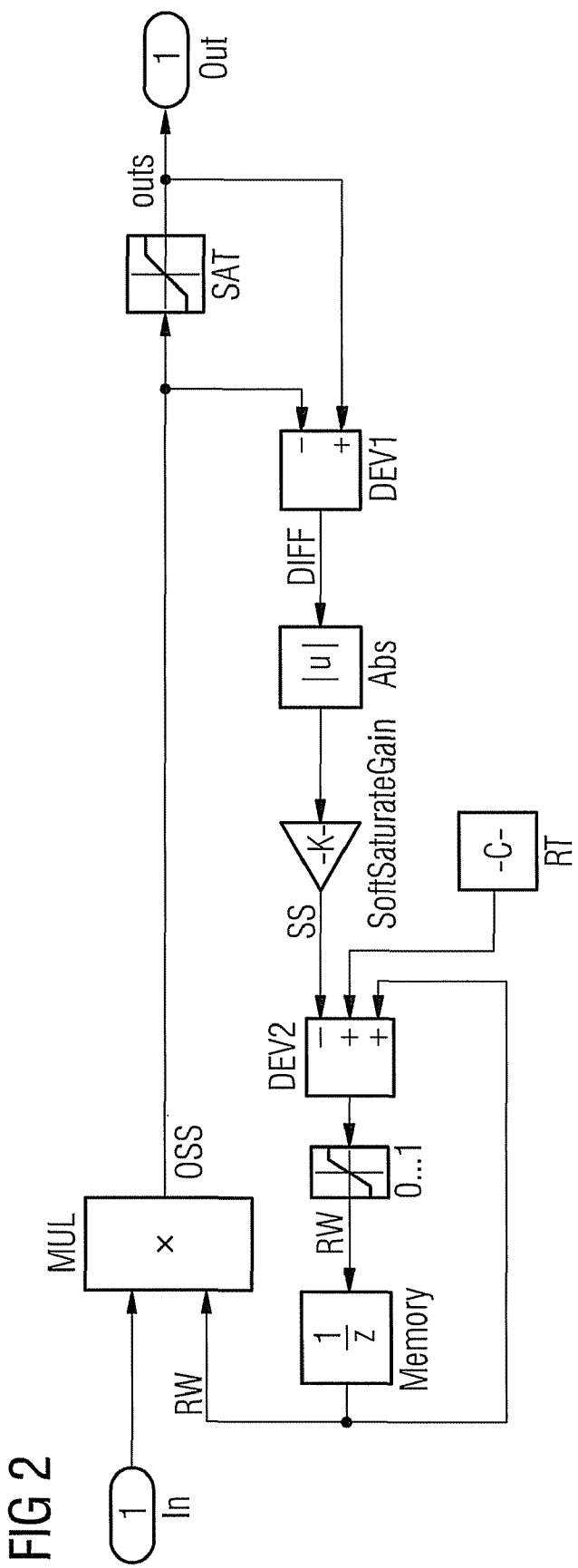
FIG. 2 shows with reference to FIG. 1 an exemplary possibility to generate a soft-saturator-function.

FIG. 2 shows with reference to FIG. 1 an exemplary possibility to generate the soft-saturator-function.

An output-signal OSS of a multiplication-unit MUL is brought as input-signal to a saturation-unit SAT. This unit SAT saturates the signal OSS to define its maximum level leading to an output-signal outs.

A difference signal DIFF between the signal OSS and the signal outs is calculated by a first deviation-unit DEV1. Later the absolute value of the difference signal DIFF is calculated and the result is multiplied by a factor "K" to calculate a steering-signal SS.

The factor K represents how fast the signal OSS is to be decreased.

The steering-signal SS represents the saturation of the signal OSS.

The steering-signal SS is brought as input-signal to a second deviation-unit DEV2. A release-time RT is brought as another input-signal to the second deviation-unit DEV2, too.

An output-signal of the second deviation-unit DEV2 is used to choose a reference-value RVV, which is brought via a memory-unit as input-signal to the multiplication-unit MUL and which is brought as input-signal back to the second deviation-unit DEV2.

The second deviation-unit DEV2 calculates a difference between their input-signals as shown.

The reference-value RVV will be "1" normally. If the saturation-unit SAT clips the signal OSS then the reference-value RVV is going to change towards "0".

Because of the described loop the reference-value RVV will lead to a decreased signal OSS. The reference-value RVV is used to avoid the clipping of the signal OSS within the saturation-unit SAT.

The invention claimed is:

1. A method for damping tower-oscillations, comprising:
   transforming a rotation into an electrical power by a generator located on top of a tower;
   transforming the electrical power from AC to DC and back to AC by a converter; and
   controlling a delivered electrical power by the converter using a power-reference-signal,
   wherein a variable offset-signal is added to the power-reference-signal before the controlling is performed, and
   wherein the variable power-offset-signal is based on a mean value of the power-reference-signal and a side-to-side-oscillation of the tower,
   wherein the variable power-offset-signal is calculated by a multiplication of a first signal and a second signal,
   wherein the first signal represents the mean value of the power-reference-signal, and
   wherein the second signal represents the side-to-side-oscillation of the tower.

2. The method as claimed in claim 1, wherein the variable power-offset-signal is saturated without clipping before the variable power-offset signal is added to the power-reference-signal.

3. The method as claimed in claim 2, further comprising a soft-saturation which includes:
   calculating a tower-oscillation-signal by a multiplication of the first signal with the second signal,
   choosing a gain-factor to be multiplied with the tower-oscillation-signal,
   reducing the gain-factor dynamically, if a peak-value of the tower-oscillation-signal reaches a predetermined saturation-limit, and
   wherein the soft saturation is done to keep the variable power-offset-signal under the predetermined saturation-limit.

4. The method as claimed in claim 1, wherein the mean value of the power-reference-signal is calculated using a chosen time interval.

5. The method as claimed in claim 4, wherein the chosen time interval is a few seconds.

6. The method as claimed in claim 1, wherein the side-to-side-oscillation of the tower is determined by measuring a vibration signal of the tower, by removing an interference signal from the vibration-signal, and by adjusting an amplitude of the interference-free signal.

7. The method as claimed in claim 1, wherein tower-oscillations of a wind turbine are damped.

8. The method as claimed in claim 7, wherein the wind turbine is damped using a same frequency as the tower oscillations with a phase shift of 180°.

9. The method as claimed in claim 7, wherein a G-sensor is used to measure tower oscillations or tower vibrations.

10. The method as claimed in claim 8, wherein the G-sensor is placed on top of the tower of the wind turbine or the G-sensor is placed within a nacelle of the wind-turbine.

11. An arrangement for the damping of tower-oscillations, comprising:
- a generator, which transforms a rotation into electrical power;
- a converter, which is connected to the generator and transform a variable-frequency AC power into a static-frequency AC power to match a frequency of a connected grid;
- a power controller, which is connected to the converter; and
- a summation-unit located between the power controller and the converter, the summation-unit adds a variable power-offset-signal to a power-reference signal before the power-reference signal is used to control the converter,
- wherein the variable power-offset-signal is based on a mean value of the power-reference-signal and a side-to-side-oscillation of the tower,
- wherein the power controller is connected with a first multiplier, and
- wherein the first multiplier calculates the variable power-offset-signal by multiplying the mean value of the power-reference-signal with the side-to-side-oscillation of the tower.

12. The arrangement as claimed in claim 11,
- wherein the power controller is connected to the first multiplier via a filtering unit, and
- wherein the filtering unit calculates the mean value of the power-reference-signal using a predetermined time-interval.

13. The arrangement as claimed in claim 12, wherein the predetermined time-interval is a few seconds.

14. The arrangement as claimed in claim 11, further comprising:
- an accelerometer, used to measure a vibration signal of the tower,
- a unit for filtering and phase adjustment, connected with the accelerometer to remove an interfering signal from the measured vibration-signal,
- a damp-gain-unit, connected with the unit for filtering and phase adjustment, the damp-unit gain adjusts an amplitude of the interference-free vibration-signal which represents the side-to-side-oscillation of the tower, and
- wherein the damp-gain-unit is connected with the first multiplier.

15. The arrangement as claimed in claim 14, wherein a G-sensor is used as the accelerometer.

16. The arrangement as claimed in claim 15, wherein the G-sensor is placed on top of the tower of the wind turbine or the G-sensor is place within a nacelle of the wind turbine.

17. The arrangement as claimed in claim 11, wherein a unit for saturation is located between the first multiplier and the summation-unit, the unit for saturation saturates the variable power-offset-signal without clipping before the variable power-offset-signal is used to control the converter.

18. The arrangement as claimed in claim 11, wherein the tower is the tower of the wind-turbine or of the nacelle.

* * * * *